United States Patent
Jain et al.

(10) Patent No.: US 11,199,410 B2
(45) Date of Patent: Dec. 14, 2021

(54) DEAD RECKONING BY DETERMINING MISALIGNMENT ANGLE BETWEEN MOVEMENT DIRECTION AND SENSOR HEADING DIRECTION

(71) Applicant: STMICROELECTRONICS, INC., Coppell, TX (US)

(72) Inventors: Mahaveer Jain, Santa Clara, CA (US); Mahesh Chowdhary, San Jose, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 221 days.

(21) Appl. No.: 16/399,829

(22) Filed: Apr. 30, 2019

(65) Prior Publication Data

US 2020/0348136 A1    Nov. 5, 2020

(51) Int. Cl.
| | |
|---|---|
| *G01C 21/16* | (2006.01) |
| *G01C 21/20* | (2006.01) |
| *G01C 21/28* | (2006.01) |
| *G01S 19/47* | (2010.01) |

(52) U.S. Cl.
CPC ........... *G01C 21/165* (2013.01); *G01C 21/20* (2013.01); *G01C 21/28* (2013.01); *G01S 19/47* (2013.01)

(58) Field of Classification Search
CPC .................................................. G01C 21/165
See application file for complete search history.

(56) References Cited

U.S. PATENT DOCUMENTS

| | | | |
|---|---|---|---|
| 6,556,895 B2 | 4/2003 | Ben-Jaacov et al. | |
| 6,763,318 B1 | 7/2004 | Winter et al. | |
| 6,826,478 B2 | 11/2004 | Riewe et al. | |
| 9,330,471 B2 | 5/2016 | Venkatraman et al. | |
| 9,752,879 B2 * | 9/2017 | Al-Hamad | G01C 21/16 |
| 9,766,074 B2 * | 9/2017 | Roumeliotis | G01C 21/16 |
| 9,797,727 B2 | 10/2017 | Georgy et al. | |
| 9,810,549 B2 * | 11/2017 | Johnson | G01C 25/005 |
| 10,371,516 B2 * | 8/2019 | Ali | G06F 3/0346 |
| 2009/0248304 A1 * | 10/2009 | Roumeliotis | G01C 21/16 701/500 |
| 2013/0046505 A1 * | 2/2013 | Brunner | G01C 22/006 702/141 |

(Continued)

FOREIGN PATENT DOCUMENTS

| | | |
|---|---|---|
| WO | 2007/143806 A2 | 12/2007 |
| WO | 2012/158751 A1 | 11/2012 |
| WO | 2018/057304 A1 | 3/2018 |

*Primary Examiner* — Alex C Dunn
(74) *Attorney, Agent, or Firm* — Seed IP Law Group LLP

(57) ABSTRACT

A device including microelectromechanical systems (MEMS) sensors is used in dead reckoning in conditions where Global Positioning System (GPS) signals or Global Navigation Satellite System (GNSS) signals are lost. The device is capable of tracking the location of the device after the GPS/GNSS signals are lost by using MEMS sensors such as accelerometers and gyroscopes. By calculating a misalignment angle between a sensor frame of the device with either the movement direction of the vehicle or the walking direction of a pedestrian using the MEMS sensors, the device can accurately calculate the location of a user of the device even without the GPS/GNSS signals. Accordingly, a device capable of tracking the location of a pedestrian and a user riding in a vehicle without utilizing GPS/GNSS signals can be provided.

19 Claims, 11 Drawing Sheets

(56) References Cited

U.S. PATENT DOCUMENTS

| | | | |
|---|---|---|---|
| 2014/0288416 A1* | 9/2014 | Mahoney | A61B 1/00158 |
| | | | 600/424 |
| 2015/0354951 A1 | 12/2015 | Ali et al. | |
| 2016/0305782 A1* | 10/2016 | Al-Hamad | G01C 21/16 |
| 2016/0313126 A1* | 10/2016 | Lemarchand | G01P 13/00 |
| 2017/0234988 A1 | 8/2017 | Jafar et al. | |
| 2018/0112983 A1* | 4/2018 | Ahmed | G01C 21/005 |
| 2018/0188032 A1* | 7/2018 | Ramanandan | G01S 19/53 |
| 2018/0259350 A1* | 9/2018 | Al-Hamad | G01S 19/42 |
| 2020/0141733 A1* | 5/2020 | Ludwig | G01C 21/165 |
| 2020/0218905 A1* | 7/2020 | Wang | G01S 19/48 |
| 2020/0272816 A1* | 8/2020 | Endres | G06K 9/6221 |

\* cited by examiner

DEAD RECKONING BY DETERMINING MISALIGNMENT ANGLE BETWEEN MOVEMENT DIRECTION AND SENSOR HEADING DIRECTION

BACKGROUND

Technical Field

The present disclosure relates to vehicle and pedestrian dead reckoning using microelectromechanical systems (MEMS) sensors.

Description of the Related Art

As mobile devices become more ubiquitous, user's expectations continue to expand. Many users regularly use the location based applications such as map applications available on current devices, such as cell phones, tablets, and infotainment systems installed in vehicles. Users access the location while driving or while walking to help them navigate where they are and where they are going. A typical mobile device includes a MEMS sensor and Global Navigation Satellite System (GNSS), or the like to detect a location of the user. For example, a MEMS sensor includes accelerometers and gyroscopes. Accelerometers are used in measuring the acceleration forces (or rate of change of velocity). Gyroscopes are used in measuring angular velocity. The mobile devices display a user's position in space on a map on a display screen.

However, when the user enters into a place where GPS/GNSS signals are weak, disturbed or unavailable, the location of the user as detected with the mobile device becomes inaccurate or unavailable. As such, the mobile device no longer accurately displays the location of the user. In addition, the conventional dead reckoning method of calculating the current position by using a previously determined position (e.g., by using GPS/GNSS sensor) and advancing that position based estimated speeds is not accurate enough.

BRIEF SUMMARY

Due to these shortcomings in the conventional navigation system and the conventional dead reckoning method, an improved device and method of accurately analyzing the location of the user is provided, which is especially beneficial when GPS/GNSS signals are not strong enough or available.

The present disclosure provides a method and system to accommodate circumstances when a user is desirous of accurate location information, but does not have a clear path to receive satellite signals, such as GNSS and GPS signals. These dead zones for GPS or GNSS signals are sometimes referred to as urban canyons, where tall buildings and other obstructions prevent consistent or strong signals. In our current ride sharing world, the ride sharing applications share a location of the driver with the rider, however, when the driver enters a garage, a tunnel, or an urban canyon, the actual location of the driver can be interrupted and then the data shared with the rider is inaccurate and likely confusing.

Pedestrians also use map applications regularly. When a person is unfamiliar with a particular city or neighborhood, many people access their map application to help acquire directions and then actively interact with the map as they follow the directions. This is something that users access when walking and when driving or riding in vehicles. Users are demanding a high degree of accuracy for their map applications. This disclosure provides a solution for more accurate location information about a user.

In particular, this disclosure identifies a difference between a vehicle mode and a pedestrian mode. The sensors in the mobile device provide data that is processed to determine if the user is in a car or walking, for example. Once the mode is determined, the disclosure provides a method for determining a misalignment angle between a vehicle reference frame and a device reference frame for the vehicle mode or a misalignment angle between a device reference frame and a movement direction of the user for the pedestrian mode.

BRIEF DESCRIPTION OF THE SEVERAL VIEWS OF THE DRAWINGS

For a better understanding of the embodiments, reference will now be made by way of example only to the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be enlarged and positioned to improve drawing legibility. Further, the particular shapes of the elements as drawn are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known algorithms or methods associated with dead reckoning have not been shown or described in detail to avoid unnecessarily obscuring descriptions of the embodiments.

Unless the context indicates otherwise, throughout the specification and claims which follow, the word "comprise" and variations thereof, such as, "comprises" and "comprising" are to be construed in an open, inclusive sense that is as "including, but not limited to." Further, the terms "first," "second," and similar indicators of the sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense that is as meaning "and/or" unless the content clearly dictates otherwise.

Figure 1A:
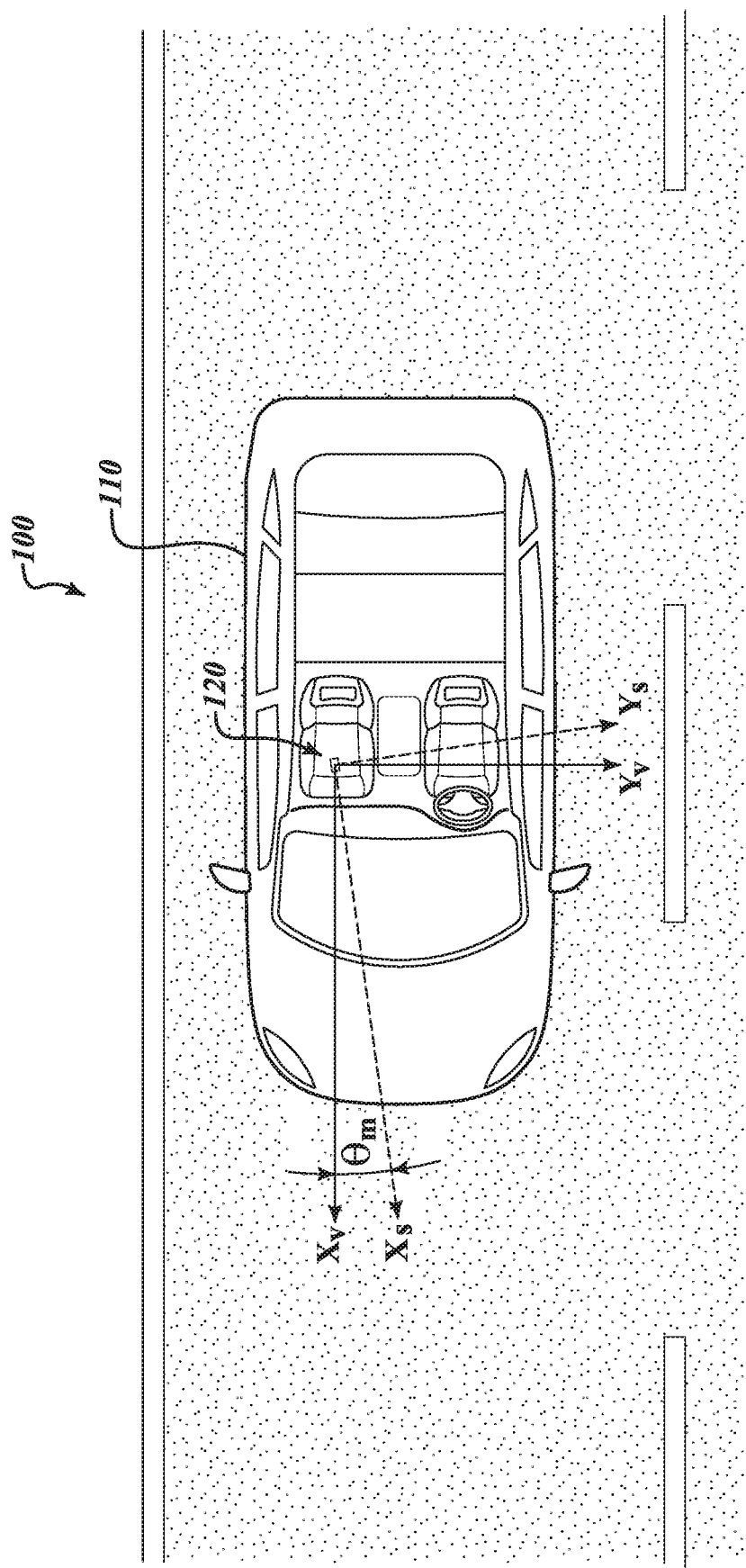
FIG. 1A is a top view of a roadway that includes a misalignment angle $\theta_m$ between a vehicle and a device positioned in the vehicle according to an exemplary embodiment of the present disclosure.

FIG. 1A is a top view 100 of a vehicle 110 on a roadway. A device 120 is positioned within the vehicle 110. The device resting in a location in the vehicle, such as on a seat, on the dashboard, or in a center console of the vehicle. As the device is not fixed with respect to the car, i.e., it can be easily moved by the user to suit the user's desires, such that a relationship of the orientation of the device with respect to the fixed three dimensional Cartesian coordinate system (XYZ axis or vehicle reference frame) of the vehicle is fluid and changes. In conventional systems, such as vehicle navigation systems, a relationship between the XYZ axis of the vehicle and sensors for speed and direction are permanently fixed. Thus, a misalignment angle between the vehicle reference frame and a sensor reference frame is calculated one time, such as in a factory calibration phase.

For mobile devices, a sensor reference frame is fixed with respect to the device, but can regularly change with respect to the vehicle reference frame. As such, a misalignment angle $\theta_m$ between the vehicle 110 and the device 120 is calculated in real time, depending on the most recently movement of the device with respect to the vehicle. If the device is coupled to a holder in the vehicle, such as an adjustable arm coupled to the dashboard, the misalignment angle may be recalculated less frequently. The system described in this disclosure will regularly determine if a position of the device has changed since the last check. Different actions are taken depending on whether the position has changed.

The device 120 includes sensors, such as GPS/GNSS sensors, accelerometers and gyroscopes, which are positioned within the device 120 in a certain location and direction.

In this example arrangement, the vehicle 110 is moving in a first direction. In a navigation perspective, a heading of the vehicle is the direction in which the vehicle is pointing and moving towards, i.e. to the left in the Figure. For example, the first direction may be a heading direction of the vehicle 110 if the vehicle is moving forward. In another example, the first direction may be a tail direction of the vehicle 110 if the vehicle is moving backward. The first direction of the vehicle 110 is indicated as $X_V$. $X_V$ is a vector that reflects the speed and direction of the vehicle 110. In one or more embodiments, the $X_V$ component reflects not only speed and direction, but also angular velocity and angular acceleration of the vehicle 110.

A second direction that is perpendicular to the first direction may be referred to as a lateral direction $Y_V$ vector. A vehicle 110 may have a lateral component $Y_V$ when the vehicle 110 turns directions (e.g., turning right or left) instead of driving in a straight direction (e.g., driving forward or backward). For example, if the vehicle 110 meets a curved road, the vehicle 110 will both have a forward direction $X_V$ component as well as a lateral direction $Y_V$ component. In one or more embodiments, the $X_V$ component is measured using an inertial measurement unit (IMU) of the device 120. The IMU includes sensors, such as a 3-axis accelerometer and a 3-axis gyroscope. The 3 axes accelerometer sensor provides specific forces sensing in three orthogonal directions. The 3 axes gyroscope sensor provides angular rates sensing in three orthogonal directions. These are sometimes referred to as 6 Degrees of Freedom (DOF) IMU sensors. The calibrated 6 DOF IMU sensors have less sensor noise and error and thus produce reliable results having good accuracy for short duration. By using these sensors, various motion-related data may be obtained by the device 120. For example, when the vehicle 110 accelerates or decelerates, the accelerometer of the device 120 will detect the acceleration and the angular acceleration of the vehicle 110 and calculate the direction of the force (F=ma; m: mass, a: acceleration) which will be indicative of the direction of the vehicle 110.

The IMU can measure and report a device's specific force, speed, movement direction, tilt direction of the device, angular velocity, angular acceleration, etc., using a combination of accelerometers and gyroscopes. The IMU allows analysis of the location of the device when GPS/GNSS receiver does not work or has a limited signal strength, such as in tunnels, inside buildings, urban canyons, or when electronic interference is present.

In some embodiments, the $X_V$ component may be measured using GPS/GNSS sensors of the device 120. The GPS/GNSS sensors can provide the speed and direction of $X_V$ of the vehicle 110 until the GPS/GNSS signal is lost. The device 120 may utilize the GPS/GNSS information received to analyze and calculate the $X_V$ component. After the signal is lost or the strength of the signal goes below a threshold incapable of locating the device 120, the device 120 may calculate $X_V$ by using the sensors in the IMU.

In other embodiments, the $X_V$ component may be measured using an odometer of the vehicle 110. In this embodiment, the vehicle 110 may be connected with the device 120 to communicate or share movement related information such as speed, direction, acceleration rate, angular velocity, angular acceleration etc. Instead of using the GPS/GNSS sensors, accelerometers, gyroscopes in the device 120, the device 120 may receive movement information directly from the vehicle 110. The connection between the device 120 and the vehicle 110 may be established through Bluetooth, Wi-Fi or any suitable wireless connection. The connection can be also established by directly connecting the device 120 to the vehicle 110 by way of a wire capable of sending and receiving data. In some embodiments, the battery charging cables for mobile devices may be utilized to receive motion data from the vehicle 110. The $X_V$ component may also be determined from a combination of these described methods.

As mentioned, in one or more embodiments, $X_V$ and $Y_V$ are vectors of the vehicle 110 indicating the speed and direction of the vehicle 110. The $X_V$ and $Y_V$ vectors of the vehicle 110 may also be indicative of, or reflecting, any movement related factors suitable for calculating the misalignment angle $\theta_m$ such as the acceleration rate, angular velocity, angular acceleration, etc., of vehicle 110 and the device 120. The $X_V$ and $Y_V$ vectors correspond to the vehicle reference frame.

The IMU which includes accelerometers and gyroscopes that are fixed within the device 120 in a certain location or a certain direction to help a user to indicate forward, backward, left and right, or north, south, east and west directions of the device 120, i.e., the device reference frame. Similar to the vehicle case, the heading of a device 120 may be determined in a similar manner. The heading of a device 120 or to be exact, the heading of the IMU (or hereinafter "sensor frame"), is the compass direction in which the sensor frame is pointing towards. In some embodiments, the heading direction of the vehicle frame and the heading of the device 120 are aligned to be in the same direction. For example, when a user is using a map application (e.g., Google Maps application) with his mobile device, sensor measurements can be used to improve the location accuracy of heading of the mobile device matches the heading direction of the vehicle frame or the IMU. If the heading of the vehicle and the heading of the sensor frame are not aligned in the same direction, sensor measurements are not usable for improving the accuracy of position.

In some embodiments, the sensor frame will be capable of finding its own tilt direction of device 120 within space using an X, Y, Z coordinate system (Cartesian coordinates) or a r, θ, φ spherical coordinate system (r: radial distance, θ: azimuthal angle, φ: polar angle) using the measurement from accelerometer and gyroscopes using sensor fusion.

The calculation of the pitch, yaw, and roll of the device 120 assists in bringing the horizontal components of the sensor frame, $X_S$, $Y_S$ to local/vehicle/navigation frame. For the purpose of calculating misalignment angle $\theta_m$, the calculation of the Z axis measurement is optional. In some embodiments, the calculation related to the Z axis sensor component may be omitted to simplify the calculation process. When a user is holding the device 120, the user does not necessarily hold the device 120 so that the device 120 is aligned with the horizon or the xy plane. While the forward direction $X_V$ and lateral direction $Y_V$ of the vehicle 110 are generally aligned or parallel to the horizon, the device 120, in most cases, is going to be tilted with respect to the horizon. This adds the complexity of calculating the misalignment angle $\theta_m$ between the vehicle 110 and the sensor frame. In one embodiment, to calculate the misalignment angle $\theta_m$, the tilt direction, which may also be calculated based on pitch, yaw, and roll of the device 120, is considered. In addition to the tilt of the sensor frame, the direction, angular velocity, angular acceleration, and any other suitable parameters of the device 120 is calculated using accelerometers and gyroscopes to extract the horizontal acceleration components. $X_S$ is indicative of the horizontal component of the forward direction (or heading direction) of the sensor frame included in the device 120. $Y_S$ is indicative of the horizontal component of the lateral direction (or side direction) of the sensor frame included in the device 120 which is perpendicular to $X_S$. In one or more embodiments, $X_S$ and $Y_S$ are vectors of the sensor frame of the device 120.

Figure 1B:
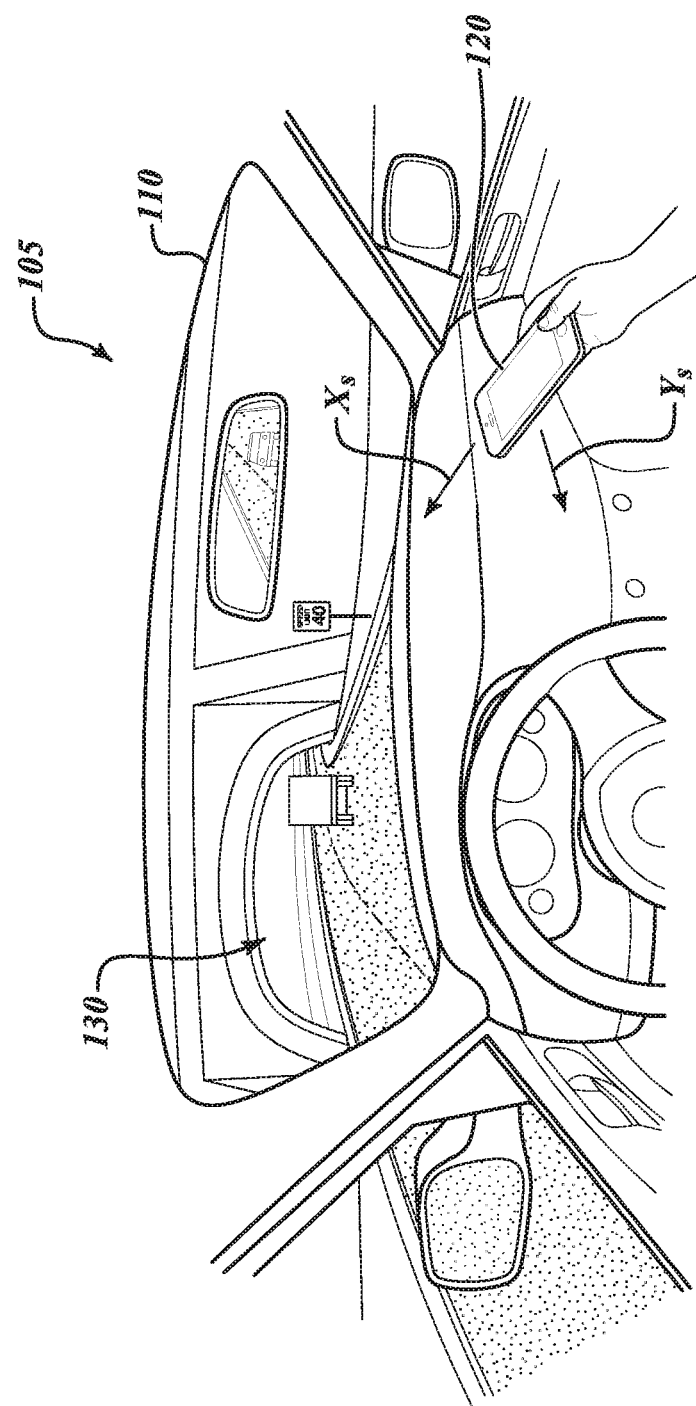
FIG. 1B is a view of a vehicle entering into a tunnel where there are low or no GPS/GNSS signals capable of being received with a device according to an exemplary embodiment of the present disclosure.

FIG. 1B is a view 105 of the vehicle 110 entering into a tunnel 130, which typically has low or no GPS/GNSS signals being received by the device 120. The vehicle 110 is moving towards a tunnel 130. Entering into a building or driving into a tunnel causes the device 120 to lose reception of GPS/GNSS signals, or receive weak signals that are incapable of providing accurate location, the location of the vehicle 110 may soon be lost. In some cases, the user who is using a map application with his device 120 to navigate to reach a destination will suffer due to the interference of GPS/GNSS signals. Here, the user is likely to experience the position of the vehicle 110 in the map application not matching the actual location of the user or will notice that the user's location as pointed in the map application being strayed away to a different location from the actual location.

By calculating the misalignment angle $\theta_m$, the device 120, inertial navigation system (INS) can utilize the sensor data to compute accurately the location of the device 120 and the vehicle 110 even if the GPS/GNSS signals are either lost or weak by using the sensors included in the device. In this embodiment, the user is holding the device 120 aligned with the horizon or the XY plane. If the device 120 is leveled, it puts the $X_V$ of the vehicle and $X_S$ of the sensor frame of the device 120 in a same XY plane, thus making the calculation of the misalignment angle $\theta_m$ between $X_V$ and $X_S$ easier. However, in most cases, as explained, the device 120 is likely to have a tilt.

To determine the degree of tilt of the device 120, the positional relationship of the device 120 in terms of X, Y, Z components is determined using a gyroscope and an accelerometer of the device 120. After the degree of tilt of the device 120 is determined, only the horizontal components of X, Y are extracted for the purpose of calculating the misalignment angle $\theta_m$. In other embodiments, if GPS/GNSS signals are received, the GPS can also be optionally used to receive the $X_S$, $X_V$ component as well as the other X, Y, Z components. By receiving speed, direction, angular velocity, and angular acceleration information from the vehicle 110 through wireless or non-wireless means, the calculations are performed by the device 120 will be reduced. The algorithms for calculating the misalignment angle $\theta_m$ based on data received from the IMU will be described in relation to FIG. 4.

Figures 2A, 2B:
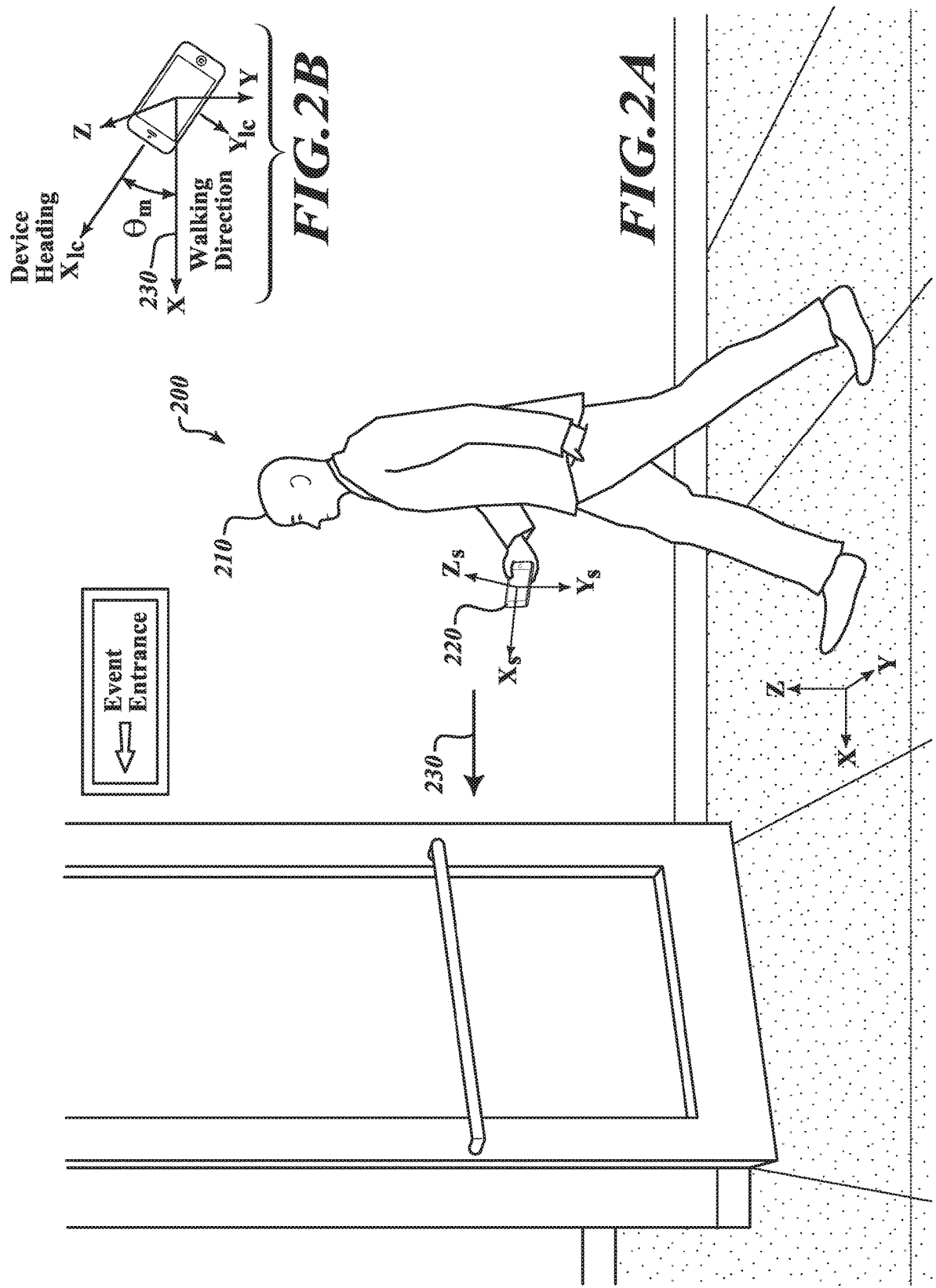
FIG. 2A is a view of a pedestrian with a device walking in a direction to enter indoors where there is a degraded GPS/GNSS signal environment according to an exemplary embodiment of the present disclosure.
FIG. 2B is an enhanced view of the device of FIG. 2A showing the misalignment angle $\theta_m$ between the walking direction and the horizontal component $X_S$ of the device according to an exemplary embodiment of the present disclosure.

FIG. 2A is a view 200 of a pedestrian 210 with a device 220 walking in a direction to enter indoors where there is a degraded GPS/GNSS signal environment. In this embodiment, the pedestrian 210 is walking into an indoor environment or passing through an area with low or weak transmission of GPS/GNSS signals. The present disclosure provides a method for detecting a real-time misalignment angle $\theta_m$ formed between the walking direction 230 of the pedestrian 210 and $X_S$ of the sensor frame of the device 220. The present disclosure provides a method for identifying a walking movement, calculating the misalignment angle in real time, and providing a location of the user to be displayed on the mobile device as a reference for the user using PDR (Pedestrian Dead Reckoning) algorithm, such as in a map application.

In this embodiment, the pedestrian 210 is holding a device 220 that has a tilt orientation that is not leveled with respect to the local XY plane. As shown in the legend, the XY plane is aligned with the horizon or the ground. In order to calculate the misalignment angle $\theta_m$ between the pedestrian's walking direction 230 and the heading direction X of the device 220, the tilt has to be analyzed to extract the horizontal components $X_{lc}$, $Y_{lc}$ of the device 220 in local frame. The Xs, Ys, Zs direction as shown in the device 220, is the direction of the device 220 or the sensor frame inside the device 220. Similar to the vehicle case, the tilt direction of the device 220 is analyzed using the gyroscope and accelerometer, and the horizontal components will be extracted from the original XYZ components of the device 220 for misalignment angle $\theta_m$ calculation purposes.

Figure 3:
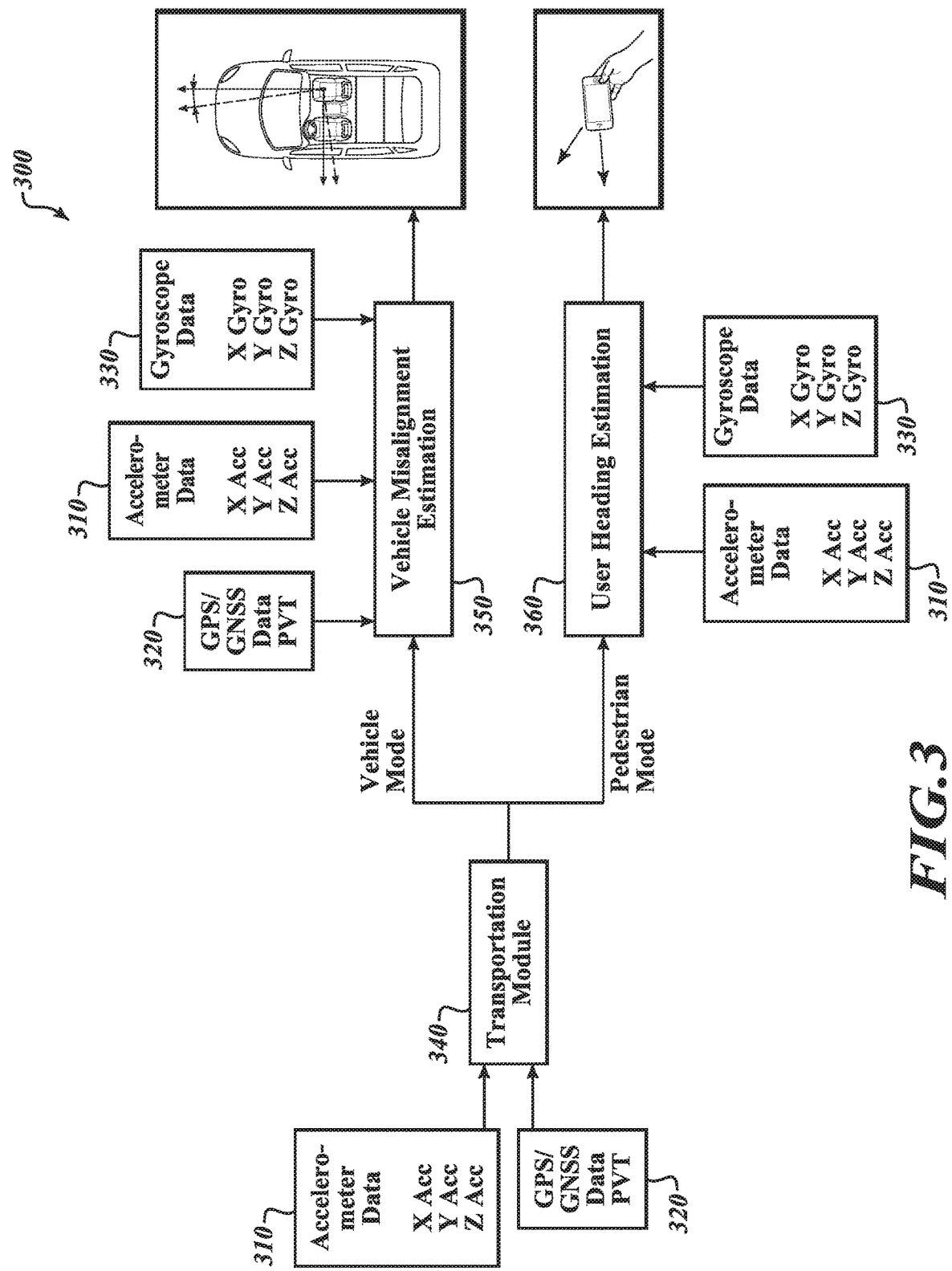
FIG. 3 is a system flow diagram showing determining a vehicle mode and a pedestrian mode with a device for calculating the misalignment angle $\theta_m$ according to an exemplary embodiment of the present disclosure.

FIG. 2B is an enhanced view of a device 220 showing the misalignment angle $\theta_m$ between the user walking direction 230 and the horizontal component $X_{lc}$ of the device 220 according to an exemplary embodiment of the present disclosure. As explained, to streamline the calculating process of the misalignment angle $\theta_m$ the horizontal acceleration components $X_{lc}$, $Y_{lc}$ of the device 220 will be extracted by using the combination of gyroscopes and accelerometers and other suitable sensors. For example, if the tilt angle with respect to the X component forms an angle $\theta_X$ with the x axis, the horizontal component $X_S$ may be calculated using the $X_{lc}=X_S \cos \theta_X$ relationship. However, in other embodiments, other suitable methods for extracting the horizontal components $X_{lc}$, $Y_{lc}$ of the device 220 may be used as appropriate. FIG. 3 is a system flow diagram 300 of determining the vehicle mode and the pedestrian mode with a device for calculating the misalignment angle $\theta_m$ according to an exemplary embodiment of the present disclosure. The transportation module 340 determines whether the user is inside a vehicle 110 or the user 210 is walking or otherwise moving without a motorized vehicle with the device 220. The transportation module may be implemented as a software program or an algorithm that is capable of being executed through a processor in the device 120, 220 or any other circuitry, programmed module, or programmable logic device (PLD) in the device 120, 220. This method of this disclosure may be performed within the device or in the cloud. The processor may include any suitable processing unit capable of performing, among other various functions of the device, the calculation based on the input from the sensors. For example, it may include, but is not limited to, mobile application processors, microprocessors implemented with electronic circuitry, a programmable logic device, programmable controller, programmable logic controller, a general purpose processor with necessary algorithms programmed to perform the function, integrated circuit (IC) or the like.

In one embodiment, the transportation module 340 receives the inputs from the accelerometer and the GPS/GNSS sensor. Under the transportation module 340, the processor can determine whether the user is walking or the user is inside a vehicle based on the accelerometer data in the X direction (X Acc), the accelerometer data in the Y direction (Y Acc), and the accelerometer data in the Z direction (Z Acc). For example, when a user is inside a vehicle, the X Acc, Y Acc, Z Acc data that is received at the processor of the device will be different from the X Acc, Y Acc, Z Acc data of a user who is walking. For example, a user walking with his mobile device may put his device in a pocket, or hold it in a certain direction so that he can watch videos from it, or type while walking. In these cases, the acceleration components of the X direction (assuming that the user is walking in a hypothetical X direction) will be significant whereas the other Y Acc, Z Acc will be less significant. In addition, when a user is carrying his mobile device in his hand and walking while swinging his arms, the acceleration components X Acc, Y Acc, Z Acc will show different characteristics compared to when inside a vehicle or watching a video with the device while walking. In addition, the magnitude of the acceleration value of a pedestrian and a user riding inside a vehicle will show different characteristics. For example, the acceleration value when a user is riding inside a vehicle will show a significantly lower value than a pedestrian walking. The user could be riding a bike, skate boarding, running or another mode of transportation that is not walking or in a motor vehicle. The motor vehicle may not be a car and may be a boat, a bus, a train, or other vehicle.

In other embodiments, the GPS/GNSS sensors can be used separately or in conjunction with the accelerometer or other sensors to detect whether the user is inside a vehicle or the user is walking. As explained, the speed of a vehicle and the walking speed of a pedestrian are going to be a significantly different. While in some cases, the pedestrian may walk or even run so that it may catch up with the speed of the vehicle, the processor of the device 120, 220 will also consider velocity changes within a predetermined interval (acceleration) to check whether the movement is indicative of a human or a vehicle. In some embodiments, the processor may use the GPS/GNSS sensors in connection with a map application of the device 120, 220, to determine whether the user is in a vehicle or not. For example, if the user is at a location such as a park (where no roads for vehicles exist) as shown in the map application, the processor may determine that the user is walking instead of determining that the user is inside a vehicle.

In one or more embodiments, the transportation module (e.g., vehicle mode or pedestrian mode detection) can be determined by using a library stored in a memory of the device or in the cloud. As explained above, the motion characteristics between a pedestrian and a vehicle are distinguishable because they show a different range in value and different data patterns. This data, based on the X Acc, Y Acc, Z Acc data as well as the user position, velocity and precise time (PVT) data from the GPS/GNSS sensors, is pre-stored in the memory. By having this library stored, the process of determining the transportation module 340 is facilitated more quickly. In some embodiments, the library can store historical accelerometer data and PVT data related to both the pedestrian mode and the vehicle mode, and when sensed Acc or PVT data shows the data pattern of a pedestrian or is within the value range of a pedestrian, the processor can determine that the transportation module is a pedestrian mode. In one or more embodiments, GPS velocity can further be used to improve the accuracy of this data motion library.

In one embodiment, the processor compares the received accelerometer data 310 and GPS/GNSS data 320 with the data in the motion library to determine whether the data values are within the range of a vehicle mode or whether the data values are within the range of a pedestrian mode. If the processor determines that the Acc and PVT data are indicative of a user inside a vehicle, the system will proceed to a vehicle misalignment estimation module 350. On the other hand, if the processor determines that the Acc and PVT data are indicative of a user that is not inside a vehicle, the system will proceed to a pedestrian mode calculation using a user heading estimation module 360.

In some embodiments, the vehicle misalignment estimation 350 uses accelerometer data 310, GPS/GNSS data 320 and gyroscope data 330 in calculating the misalignment angle $\theta_m$. While the GPS/GNSS data 320 improves the accuracy of the misalignment angle $\theta_m$, as mentioned in connection with FIG. 1B, the GPS/GNSS data 320 may not be present once the vehicle enters into a tunnel. The vehicle misalignment estimation module 350 may calculate the misalignment angle $\theta_m$ without relying on GPS/GNSS data 320. The calculation method may use motion dynamics and the application of Singular Value Decomposition (SVD) in retrieving the misalignment angle $\theta_m$.

The user heading estimation module 360 uses accelerometer data 310 and gyroscope data 330 in calculating the misalignment angle $\theta_m$ between the walking direction of the pedestrian and the horizontal component of the forward heading of the sensor frame. While the GPS/GNSS data 320 improves the accuracy of the misalignment angle $\theta_m$, the GPS/GNSS data 320 may not be present at all times. The calculation method may use motion dynamics, forward-backward detection and the application of SVD calculation method.

In one or more embodiments, the algorithms for a vehicle mode and a pedestrian mode, do not depend on the GPS/GNSS signals. Although the presence of the GPS/GNSS signals helps enhance the accuracy of the data, the GPS/GNSS signals are not essential in the analysis. For the vehicle case, the algorithm may rely on vehicle motion data and inertial sensor data. For the pedestrian case, the algorithm may rely on human walking motion data and inertial sensor data.

Figure 4:
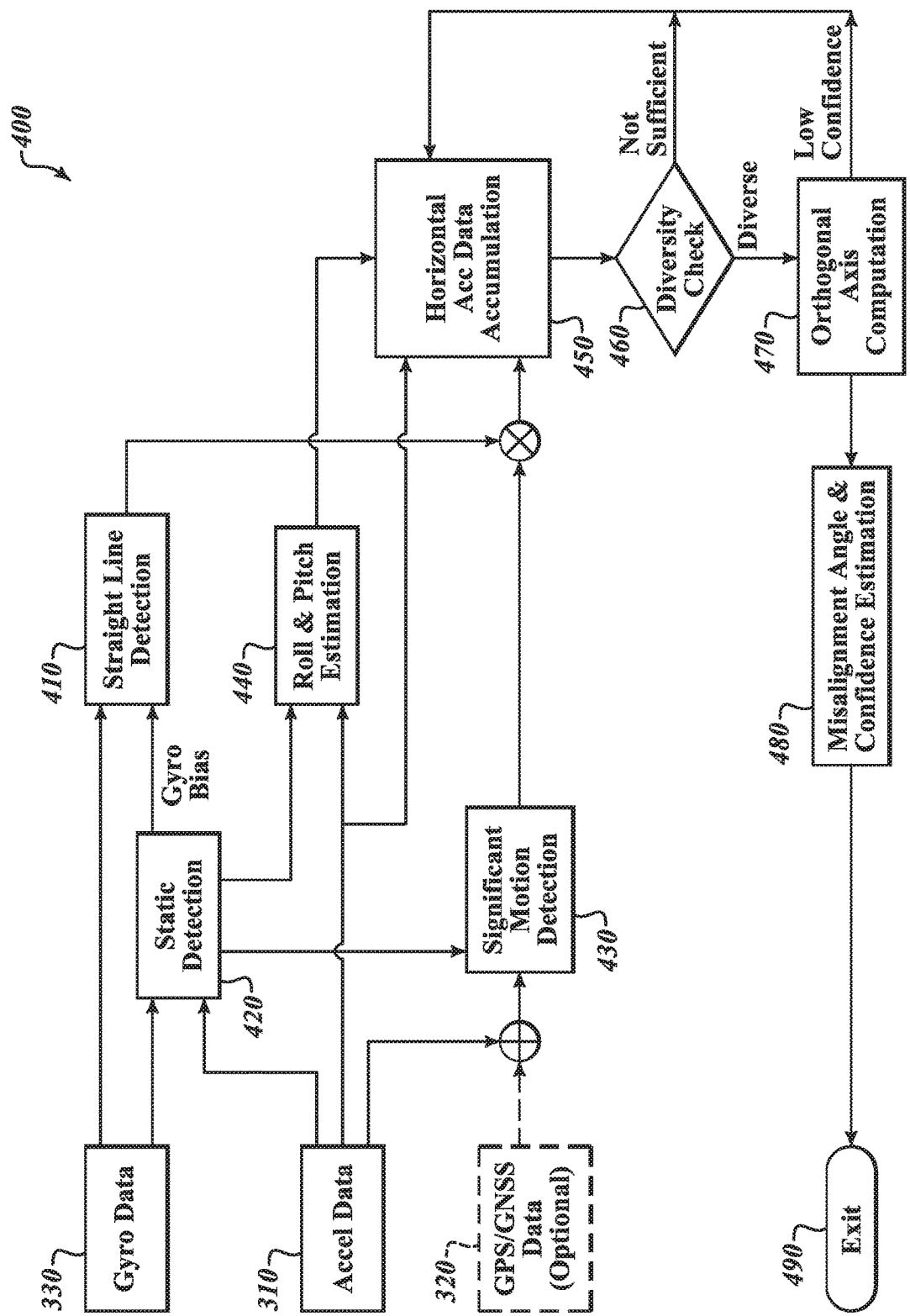
FIG. 4 is a flow diagram showing determining a misalignment angle $\theta_m$ under the vehicle mode according to an exemplary embodiment of the present disclosure.

FIG. 4 is a flow diagram 400 of determining a misalignment angle $\theta_m$ under the vehicle mode according to an exemplary embodiment of the present disclosure. The processor of the device 120 determines the motion state of the device in the vehicle based on the gyroscope data 330 and the accelerometer data 310. In one embodiment, the accelerometer and gyroscope are sampled at 15 Hz and the GPS/GNSS sensor is at 1 Hz.

The misalignment angle determination algorithm initializes at a stationary condition, when sensor does not detect any vehicle speeds or movements. During the initialization process, the algorithm computes a gravity vector, gyro bias, and resets all variables at the default value. This algorithm runs in real time adapting to a changing location of the device with respect to the vehicle and a changing state of the vehicle. The update process depends on the various motion state of the vehicle (e.g., straight line detection, static detection, and significant motion detection).

At static detection module 420 it is determined if the vehicle is stationary or moving by evaluating sensor input from the accelerometer and the gyroscope of the device 120. Static detection is important to initialize gravity vector and gyro bias computation. If the accelerometer in the device 120 senses an acceleration value below a threshold value indicating that there is acceleration movement in any direction, the processor may determine that the vehicle 110 is stationary or moving at a constant velocity. Such readings may occur if the vehicle is stationary and if the user has placed the device on a seat of the vehicle, another surface in the vehicle, or has attached the device to a fixed holder in the vehicle. In reality, unless the vehicle is at a complete stop, a noise value of the acceleration in any direction may be present.

In many situations, the user will be holding the device in their hand or lap. As such, there will be human speed movements detected by the accelerometers and gyroscopes of the device, however this system regularly evaluates the movements for human vs. vehicle movements and can determine quickly which types of movements are occurring and reject such measurements.

If the accelerometer senses angular acceleration or gyroscope senses significant angular velocity, the processor may determine that the vehicle 110 is not moving in a straight line (e.g., driving on a curved road). Further, to confirm the motion state of the vehicle 110, the processor may use the gyroscope data 330 in combination with the accelerometer data 310 and may consider both the gyroscope data 330 and the accelerometer data 310 at the same time, or analyze the data one at a time in any order.

The straight line detection is performed primarily to extract segments of measurement data where the vehicle is moving in a straight line and no significant lateral acceleration is observed. The straight line detection is driven by tests on negligible (above threshold) yaw rate condition over fixed window length. At the straight line detection block 410, the processor may confirm that the vehicle is moving in a straight line by further utilizing the gyroscope data 330 along with the accelerometer data 310. For example, the gyroscope data may show information about the motion status of the vehicle 110 when the vehicle accelerates or decelerates. When the vehicle accelerates, the gyroscope of the device 120 can pick up the motion information because the device 120 will likely observe the vehicle's engine vibration. Gyro bias may also be considered in connection with analyzing the motion status of the vehicle at block 410 and block 420. Libraries of information may be accessible by the system to compare the detected movements, acceleration and lateral movements, with known thresholds.

After the initial determination of the motion status of the vehicle, if the static detection block 420 determines that the motion dynamics are significant, the process moves to the significant motion detection block 430, which extracts sensor data during motion when acceleration (above a threshold) is present in the longitudinal (forward) direction. When the vehicle is moving at constant speed motion, there is no sufficient information available to help with determination of misalignment angle. During acceleration or deceleration sensor data for this motion contains sufficient information about motion direction. In one embodiment, the significant motion is detected using GPS speed if GPS is available. In one embodiment, the module checks the change in speed from last 2 seconds or total horizontal acceleration in 1 second. Here, if the vehicle is stationary, the gravity vector may be updated with high weight and the gyro bias may be computed. If the vehicle is not moving in a straight line or no significant motion detected, the processor may wait for the next measurement epoch.

Referring back to the significant motion detection block 430, the processor uses the accelerometer data 310 to determine if motion dynamics are significant to use it for calculation of the misalignment angle and confidence estimation. In other embodiments, the processor may use the GPS/GNSS data 320, if available, to determine the motion dynamics and use it for calculating misalignment angle and confidence estimation. In one embodiment, a significant motion dynamic may refer to an event of a vehicle 110 moving in a non-static manner while changing the directions of the vehicle 110. For example, if the vehicle 110 is constantly making turns left to right, these motions may be referred to as being significant and will be sensed through the accelerometer. In other examples, a vehicle's motion may be significant when the angular velocity of the vehicle 110 changes frequently in a certain period of time. The value of the angular velocity of the vehicle 110 may also be used in determining significant vehicle motion.

In the roll and pitch estimation block 440, the accelerometer is used to determine the roll and pitch angle of the device 120. The roll and pitch angle of the device 120 or exactly the sensor frame of the device 120 can be computed by combining the gyroscope signals X Gyro, Y Gyro, Z Gyro. Based on the roll and pitch value, the accelerometer signals X Acc, Y Acc is tilt compensated. In some embodiments, the gyroscope signals X Gyro, Y Gyro, Z Gyro and the accelerometer signals X Acc, Y Acc, Z Acc is tilt compensated. These tilt compensated signals are then finally filtered in order to select the straight horizontal parts.

In the horizontal data accumulation block 450, the processor receives all of the input from, the accelerometer data 310, as well as the input processed through the straight line detection block 410, the significant motion detection block 430, and the roll and pitch estimation bloc 440. In some embodiments, the processor may not use all of the data and may use only some of the sensed data at the horizontal data accumulation block 450. For example, depending on the circumstances, the GPS/GNSS data does not have to be factored in calculating at the horizontal data accumulation block 450. In other examples, if there is only a straight line movement in the vehicle, the data processed through the significant motion detection block 430 may be omitted or not used. In some embodiments, the horizontal data accumulation block 450 keeps these data in the buffer of the device 120, 220. If the amount of data reaches a threshold indicating sufficient minimum data for misalignment calculation, the processor will proceed with the misalignment angle estimation based on the accumulated data.

At the diversity check block 460, the processor determines whether the accumulated data is diverse enough to move forward with the calculation of the misalignment angle. If the processor does not determine that the data is sufficient enough, the process will move back to the horizontal data accumulation block 450 for further data accumulation. When the processor determines that there is sufficient minimum data for misalignment calculation in the buffer, the processor can go over another diversity check at the diversity check block 460 to determine whether diversity requirement has been met. At the orthogonal axis computation block 470, the processor computes the inputs based on the data received from the horizontal data accumulation block 450 using an autocorrelation transformation matrix.

During or after computing using the autocorrelation transformation matrix, a SVD method is used to minimize the correlation between the two X, Y components of accelerometer signal (e.g., acceleration vector) in horizontal frame after applying tilt.

$$\begin{bmatrix} XAcc \\ YAcc \end{bmatrix}_{2 \times N} \rightarrow \text{Auto Correlation Block} \rightarrow$$

$$\begin{bmatrix} \Sigma\, X\,Acc*Xacc & \Sigma\,X\,Acc*Yacc \\ \Sigma\,Y\,Acc*Xacc & \Sigma\,Y\,Acc*Yacc \end{bmatrix}_{2 \times 2} \rightarrow SVD$$

In one embodiment, the two X, Y components of accelerometer signal after being processed using the SVD method, may refer to the horizontal value in the vehicle frame ($X_V$ and $Y_V$) and the horizontal component of the sensor data ($X_{lc}$ and $Y_{lc}$).

In one or more embodiments, by using the above computation method, the relationship between the acceleration component of the vehicle and the acceleration component of the sensor frame may be established as follows:

$$Acc_{VEHICLE} = R * Acc_{SENSOR} (R \text{ denotes the rotation matrix})$$

The rotation of the orthogonal transformation represents the misalignment angle $\theta_m$.

The horizontal components of the vehicle $X_V$ and $Y_V$ extracted from the horizontal data accumulation block 450 may be represented using the below matrix.

$$Acc_{VEHICLE} = \begin{bmatrix} XAcc\_Vehicle \\ YAcc\_Vehicle \end{bmatrix}$$

In addition, the horizontal components of the sensor data extracted from the horizontal data accumulation block 450 may be represented using the below matrix.

$$Acc_{SENSOR} = \begin{bmatrix} XAcc_{Sensor} \\ YAcc_{Sensor} \end{bmatrix}$$

By applying the rotation matrix according to the aforementioned $Acc_{VEHICLE} = R * Acc_{SENSOR}$ formula, $$R = \begin{bmatrix} \cos(\text{Angle}) & \sin(\text{Angle}) \\ -\sin(\text{Angle}) & \cos(\text{Angle}) \end{bmatrix},$$

where Angle=misalignment angle $\theta_m$

The following equation can be established.

$$\begin{bmatrix} XAcc\_Vehicle \\ YAcc\_Vehicle \end{bmatrix} = \begin{bmatrix} \cos(\text{Angle}) & \sin(\text{Angle}) \\ -\sin(\text{Angle}) & \cos(\text{Angle}) \end{bmatrix} * \begin{bmatrix} XAcc_{Sensor} \\ YAcc_{Sensor} \end{bmatrix}$$

The calculation of the above equation produces the misalignment angle $\theta_m$ between the vehicle and the sensor frame.

In some embodiments, by applying the orthogonal transformation to identify the axis orientation, it is possible to minimize the correlation between two acceleration vectors which are in the sensor frame. In other embodiments, the orthogonal transformation is applied such that the correlation of $Acc_{VEHICLE}$ can be minimized.

After the orthogonal axis computation block 470 produces the misalignment angle, at misalignment angle and confidence estimation block 480 the reliability of the angle is tested to minimize the error and increase the level of confidence of the misalignment angle. In one embodiment, at the confidence estimation block 480, the processor computes the confidence in the output which allows to filter poor estimates. By filtering out the poor estimates, it improves the quality and the reliance of the final output. In some embodiments, to minimize the error any suitable error minimization algorithm may be applied and is not necessarily confined to certain limited algorithms. In other embodiments, updated data may be received from the gyroscope data 330 or the accelerometer data 310 to reduce the error in the misalignment angle.

In one or more embodiments, a diversity check or a data validity check is performed to ensure the quality and the accuracy of the data. This validity check may be performed at block 460, or may be performed at block 480. In other embodiments, the data check may be performed during any suitable stage in order to maintain the integrity and the accuracy of the data. The data check process is not limited to being performed at only certain stages of the algorithm. For example, the data validity check may be performed at any phase of the stage of the algorithm depending on the change of the motion status (e.g., a significant change in motion for both the vehicle and the pedestrian). That is, the data validity check process may be also used in the user heading estimation 605 which will be explained in relation to FIG. 6. In this vehicle misalignment estimation mode, for example, a validity check may be performed based on straight line detection 420 and significant motion detection 430. This check is performed to ensure that the vehicle is moving in a straight line and the sensors are collecting some signature signal relevant for misalignment angle determination.

In some embodiments, once validity is confirmed, both components of horizontal acceleration, e.g., X and Y component of the horizontal acceleration, are stored in cumulative form to minimize the storage. For example, the data may be stored in the form of a mean, variance, cross-correlation, or the like.

In one embodiment, the misalignment angle output is computed, if the total accumulated points reach a threshold of 5 seconds window length. Once a sufficient number of misalignment angle estimates is computed in a window of data, the diversity of data is analyzed to ensure sufficient variation is extracted from data. In some embodiments, diversity is checked using Eigenvalue ratio. If sufficient diversity is observed, then, a confidence measure may be computed using the following steps.

In one exemplary embodiment, it can prepare the cross-covariance matrix for horizontal acceleration components (orthogonal) using cumulated value available from the previous computation step. Then it can find an orthogonal rotation to minimize the cross-correlation between horizontal acceleration components. The step may proceed to compute confidence measure by taking the ratio of cross-correlation at the optimum angle and orthogonal axis (minima). If confidence is significantly high, the algorithm produces the estimate of misalignment angle. On the other hand, if the confidence is not high, then the algorithm may wait for additional data in a subsequent window (or epoch).

In some embodiments, the algorithm utilizes periodic resets, in order to avoid accumulation of poor quality signal in the buffer which can influence the estimation of misalignment angle. In one exemplary embodiment, the steps to reset calculation are as follows: If the number of points accumulated is more than 50 seconds and confidence measure from the algorithm is less than 0.5, then, the algorithm may be reset. If the number of points accumulated is more than 100 seconds, the algorithm may store the current angle and reset the algorithm.

In some embodiments, the algorithm produces an acceptable level of accuracy for vehicle mode cases. For example, the misalignment angle produced under the vehicle estimation module will have less than 5 degrees deviation from the actual route.

In some embodiments, as explained previously, instead of using the GPS/GNSS data 320, the device 120 may receive movement information directly from the vehicle 110. The connection between the device 120 and the vehicle 110 may be established through wireless connection means as well as hard-wired means. By utilizing the data directly from the vehicle's sensors such as odometers and accelerometers, the calculation process may become more simplified.

In one or more embodiments, a non-holonomic constraint of the vehicle may be used in the calculation of the misalignment angle $\theta_m$. Due to non-holonomic constraints, the most motion dynamics (e.g., acceleration or deceleration) is in the longitudinal (or forward) direction of the vehicle 110 and the large component of total acceleration is contributed by forward acceleration during acceleration and deceleration. For example, during navigation, the vehicle generally moves forward along a straight line in many cases which makes the dynamics of the vehicle motion restricted to a forward/longitudinal direction. That is, when the vehicle moves along a straight line or road, the large component of the total acceleration will consist of longitudinal direction acceleration at acceleration and deceleration. The lateral direction component which is perpendicular to the longitudinal direction is likely to be minimal since most of the movement of the vehicle would be focused on moving forward. The lateral acceleration component will show significant acceleration value when the vehicle is making a right turn or a left turn or a U turn. Considering these constraints may reduce or simplify the variables, formulas, and algorithms involved in the misalignment angle calculation process.

In one embodiment, when a vehicle is accelerating or decelerating in a straight line motion, a change in vehicle's forward acceleration provides sufficient information to estimate the misalignment angle offset between vehicle and sensor reference frame. The correlation between longitudinal and lateral axis acceleration is minimum at this condition and the correlation due to the noise is not very significant. The orthogonal transformation minimizes the correlation between the longitudinal and lateral axis acceleration. The orthogonal transformation method is used to identify the axis in which most significant motion occurs (vehicle's motion in the longitudinal direction in a straight line) while minimizing the correlation between two horizontal acceleration vectors.

In one or more embodiments, the straight line detection block 410, the significant motion detection block 420, the significant motion detection block 430, the roll and pitch estimation block 440, the horizontal data accumulation block 450, the diversity check block 460, the orthogonal axis computation block 470, and the misalignment angle and confidence estimation block 480 may be implemented as modules or units for processing input data. These logic blocks may be implemented within the processor and may perform according to specific algorithms or command instructions. However, in other embodiments, these logic blocks may be implemented as separate circuitry or chips that communicated with the main processor of the device 120.

Figure 5:
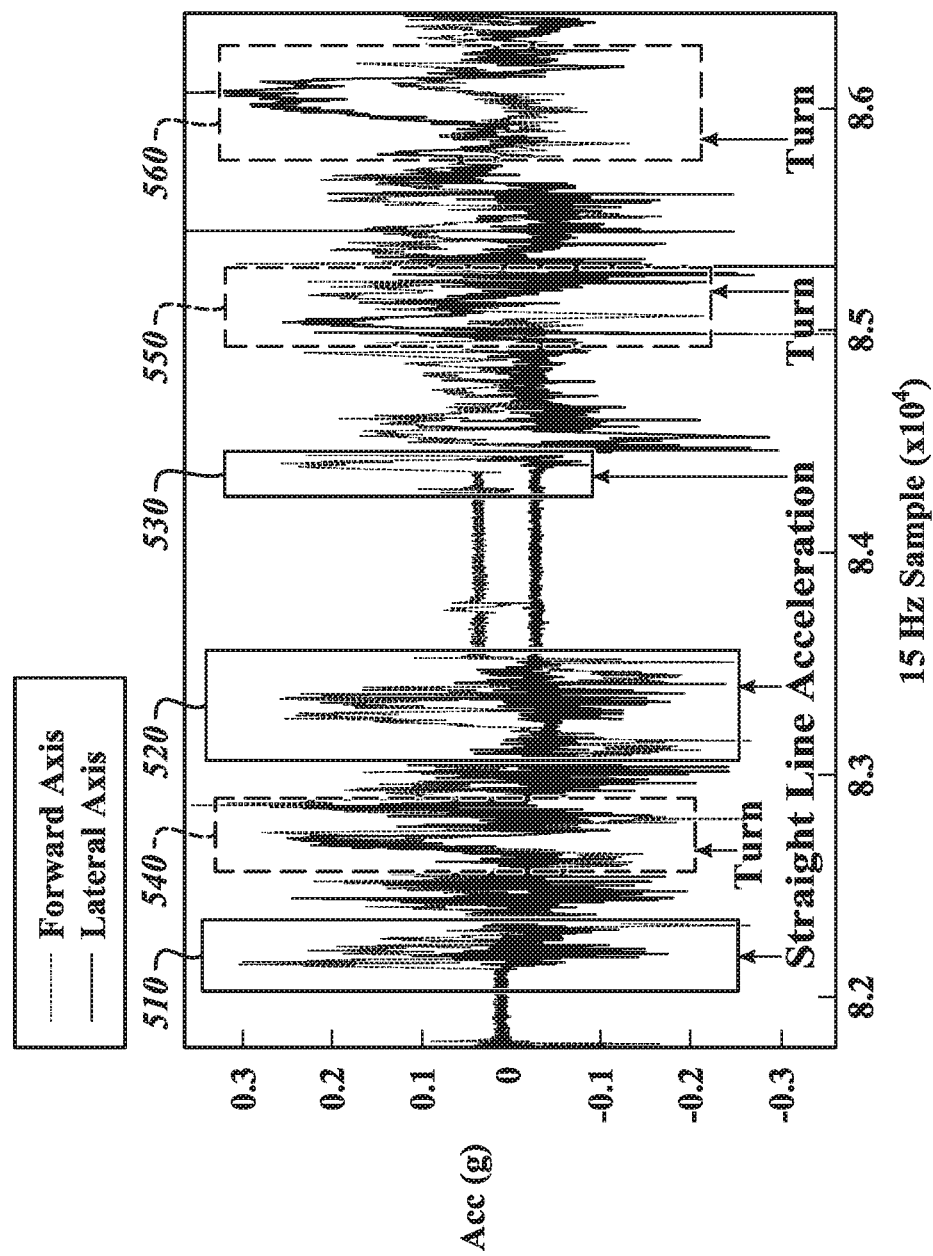
FIG. 5 is an exemplary graph of a horizontal acceleration measured by an accelerometer according to embodiments of the present disclosure.

FIG. 5 is an exemplary graph of a horizontal acceleration measured by an accelerometer according to embodiments of the present disclosure. In FIG. 5, a horizontal acceleration component detected along the forward direction or the forward axis as well as the horizontal acceleration component detected along the lateral direction or the lateral axis is shown. When a vehicle is moving straight, and in case of a perfect alignment where the misalignment angle $\theta_m$ is 0 degrees, the signal measured by accelerometer should be concentrated only in the axis pointing forward, with the lateral axis sensing pure noise. On the other hand, in case of imperfect alignment where the misalignment angle $\theta_m$ is not 0 degrees, the amount of the forward acceleration will be sensed by the lateral axis. Accordingly, a vehicle's forward acceleration provides sufficient information to estimate the angle offset between the vehicle reference frame and the sensor reference frame.

FIG. 5 shows that the vehicle makes a turn at 540, at 550, and at 560. This can be observed in the accelerometer reading where it indicates a maximum variation value of acceleration at the lateral axis. It further shows that the lateral acceleration component has a larger value than the forward acceleration component of the vehicle. On the other hand, when the vehicle moves in a straight line and only accelerates or decelerates, the lateral acceleration component of the vehicle will have a smaller value than the forward acceleration component. At 510, 520, and 530, it can be seen that the forward acceleration value has a larger value than the lateral acceleration value. While the lateral axis component may still have some value, these lateral components are likely to indicate noise or may be indicative of the fact that the vehicle is changing lanes (e.g., the vehicle does not make a steep turn in changing lanes as compared to making a right turn or a left turn).

Figure 6:
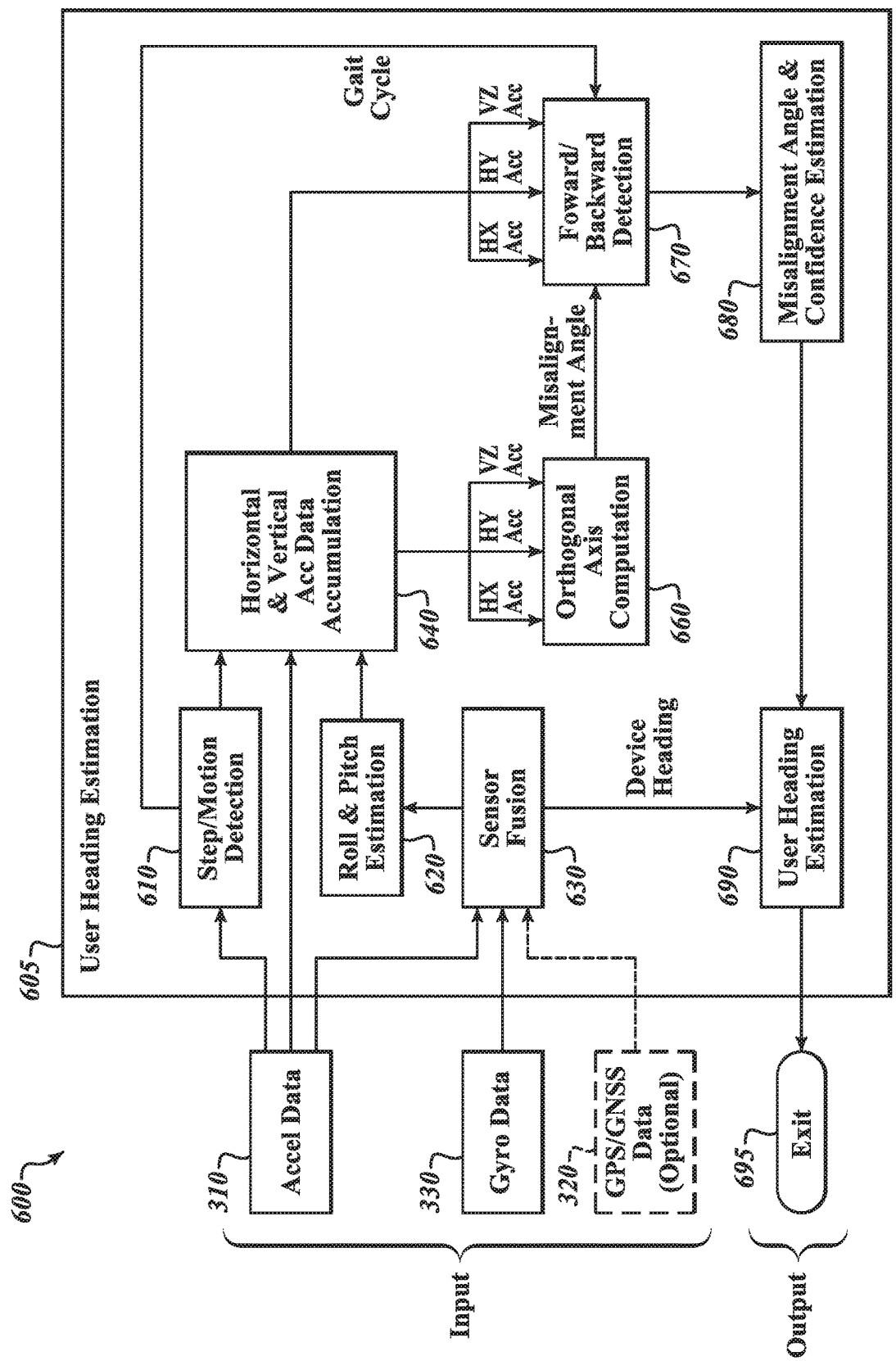
FIG. 6 is a system flow diagram showing determining a misalignment angle $\theta_m$ under a pedestrian mode according to an exemplary embodiment of the present disclosure.
Figure 8A:
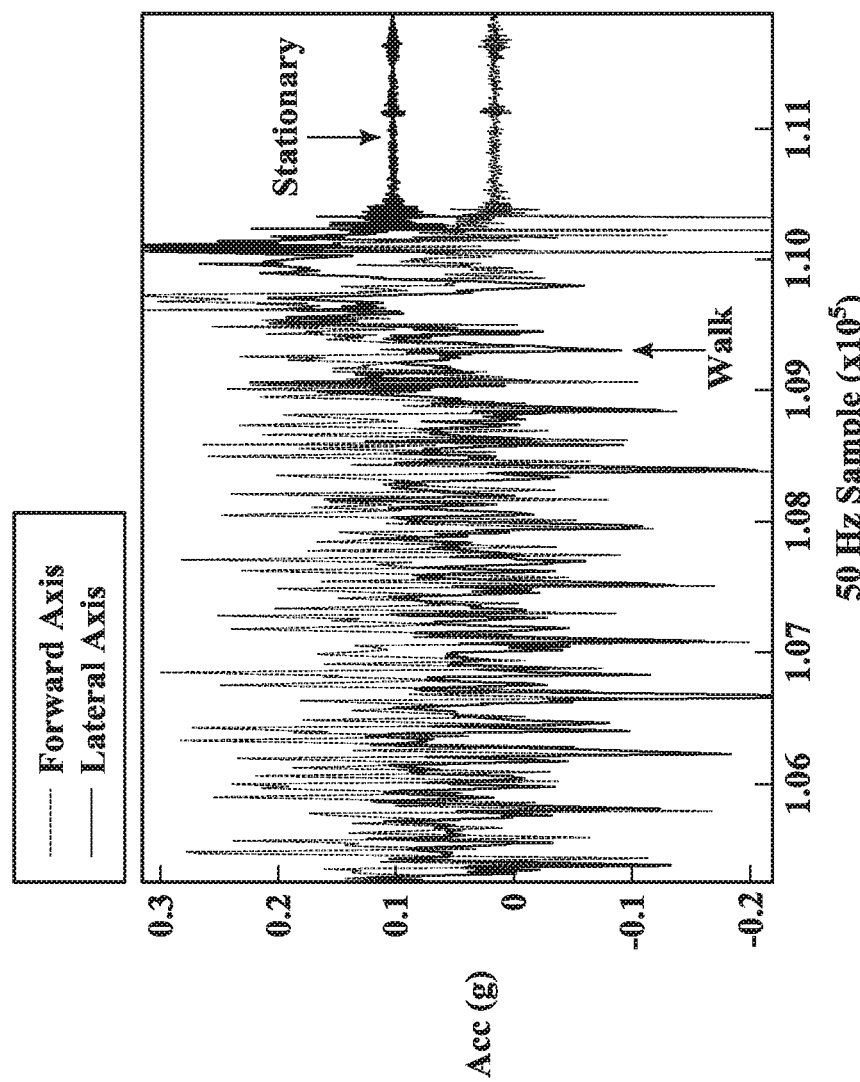
FIG. 8A is a graph showing horizontal acceleration measurements detected using an accelerometer of a device within a vehicle.

FIG. 6 is a system flow diagram 600 of determining a misalignment angle $\theta_m$ under the pedestrian mode according to an exemplary embodiment of the present disclosure. The flow diagram provides an exemplary method of determining a user heading direction which enables pedestrian indoor navigation using a device 220. For example, when the user is walking, the major components of acceleration are in a forward direction and a vertical direction. If the device is a fitness watch and is tied to the wrist or the arm, the swing motion of the arm is aligned with the walking direction of the user. Referring to FIG. 8A, when the user is walking, the acceleration component in the forward direction or the forward axis is indicated as fluctuating. On the other hand, when the user is stationary, the acceleration component in the forward direction is indicated as maintaining a steady value because there is no acceleration in that direction. Depending on the tilt of the device and the motion status, the acceleration component in the lateral direction or the lateral axis may also fluctuate but at a degree less than the forward direction.

When a user is walking, the walking cycle may include two main phases. One of the phases may be referred to as a stance phase and the other phase may be referred to as a swing phase. During both phase, at least one leg is in contact with the ground and the other leg may be in motion. Due to these two phases, a gait acceleration and a gait cycle exhibit periodicity can be determined. The gait cycle is determined at the step/motion detection block 610.

In the step/motion detection block 610, the processor of the device 220 determines the motion state of the pedestrian based on the accelerometer data 310. In particular, the processor detects the pedestrian's step information in order to extract the signal that is relevant to the gait cycle based on the received accelerometer data 310. That is, the step detection is used to determine the signal that is related to the motion of the pedestrian. In some embodiments, the step/motion detection block 610 may provide step frequency as well as the gait cycle of the pedestrian based on the received accelerometer data 310. One method of detecting a pedestrian's step is by determining the step by detecting the peaks in the total acceleration. By receiving accelerometer data 310 at a given time, the processor can determine the step and the gait cycle by the peak value of acceleration detected during the measured period.

In the sensor fusion block 630, the processor of the device 220 receives sensor data based on the gyroscope data 330 and the accelerometer data 310. In some embodiments, the processor of the device 220 may also use the GPS/GNSS data 320. Depending on the signal reception strength of the GPS/GNSS data 320, using the GPS/GNSS data 320 may be optional at the sensor fusion block 630.

The process of sensor fusion at the sensor fusion block 630 considers the data from the MEMS sensors in the IMU (e.g., the gyroscope data 330 and the accelerometer data 310) and in certain circumstances the GPS/GNSS data 320 where it is available due to the various human motion. For example, the human motion is not necessarily limited to 2D (two dimensional) movements and has significant dynamics in all 3D (three dimensional) plans. In order to project acceleration data from sensor frame to the user frame, higher accuracy of sensor fusion is used to compute the Euler angle that consists of a heading, pitch, and roll. In some embodiments, Extended Kalman Filter (EKF) based sensor fusion can be used for higher accuracy of sensor fusion to determine.

In the roll and pitch estimation block 620, the sensor data from the IMU is used to determine the roll and pitch angle of the device 220. The roll and pitch angle of the device 220 or the exact sensor frame of the device 220 is detected using the gyroscope signals as well as accelerometer signals. To improve accuracy, in places where the GPS/GNSS signals are available, the GPS/GNSS signals may also be used in conjunction to improve accuracy. Based on the gyroscope signals X Gyro, Y Gyro, Z Gyro and the accelerometer signals X Acc, Y Acc, Z Acc, the roll angle, and the pitch angle is extracted. In some embodiments, the gyroscope signals X Gyro, Y Gyro, Z Gyro and the accelerometer signals X Acc, Y Acc, Z Acc are tilt compensated based on the extracted roll and pitch angle of the sensor frame.

In the horizontal and vertical accelerometer data accumulation block 640, the output of sensor fusion angles are used to project acceleration data to resolve horizontal acceleration and vertical acceleration. In particular, the processor receives all of the input from the gyroscope data 330, the accelerometer data 310, and the GPS/GNSS data 320 (if available), as well as the input processed through the step/motion detection block 610, the roll and pitch estimation block 620, and the sensor fusion block 630. In some embodiments, the processor may not use all of the data and may use only some of the sensed data at the horizontal and vertical accelerometer data accumulation block 640. For example, depending on the circumstances, the GPS/GNSS data 320 may not be factored in calculating at the horizontal and vertical accelerometer data accumulation block 640. In some embodiments, the horizontal and vertical accelerometer data accumulation block 640 keeps these data in the buffer of the device 220. If the amount of data reaches a threshold indicating sufficient minimum data for misalignment angle calculation between the sensor heading and the walking direction 230, the processor will proceed with the orthogonal axis computation at block 660 based on the accumulated data.

After extracting the sensor data with significant motion in the horizontal frame, the orthogonal transformation of this data is applied in order to compute the pedestrian's direction of walking. The algorithm also includes a unique method to determine the absolute direction of walking 230 using forward-backward detection algorithm to resolve the ambiguity of direction. This will be explained in more detail in connection with FIG. 7.

First of all, at the orthogonal axis computation block 660, the processor computes the inputs based on the data received from the horizontal and vertical accelerometer data accumulation block 640. In particular, the processor extracts the horizontal X axis component of the acceleration HX Acc, the horizontal Y axis component of the acceleration HY Acc, and the vertical Z axis component of the acceleration VZ Acc. Then the computation is performed using an autocorrelation transformation matrix. In one embodiment, the autocorrelation between horizontal axis HX Acc and HY Acc is computed. Further, the singular value decomposition (SVD) operation is performed to minimize the correlation between 2 axes or the two X, Y components of the accelerometer signal (e.g., acceleration vector). The minimization process results in the misalignment angle $\theta_m$ between the sensor frame and the walking direction. This process will produce the offset in the range of [0, 180] degrees because the computation of the autocorrelation matrix includes amplitude and not the direction. The misalignment angle produced based on the orthogonal axis computation is then passed on to the forward/backward detection block 670.

At the forward/backward detection block 670, the processor receives the gait cycle information from the step/motion detection block 610, the horizontal X axis component of the acceleration HX Acc, the horizontal Y axis component of the acceleration HY Acc, and the vertical Z axis component of the acceleration VZ Acc from the horizontal and vertical accelerometer data accumulation block 640, and the misalignment angle from the orthogonal axis computation block 660. The detail of the algorithms of the forward/backward detection block 670 will be explained in relation to FIG. 7.

After the forward/backward detection block 670 produces the misalignment angle, at misalignment angle and confidence estimation block 680 the reliability of the angle is tested to minimize the error and increase the level of confidence of the misalignment angle. In some embodiments, to minimize the error any suitable error minimization algorithm may be applied and is not necessarily confined to certain limited algorithms. In other embodiments, updated data may be received from the gyroscope data 330 or the accelerometer data 310 to reduce the error in the misalignment angle.

At the user heading estimation block 690, the processor receives the walking direction 230 of the pedestrian from the output of the sensor fusion block 630 and compares with the misalignment angle to further calculate the overall path that the pedestrian moved by using the gyroscope data 330 and the accelerometer data 310. In some embodiments, the output of the overall path that was calculated while the GPS/GNSS signals were absent may be sent to the device 220 of the pedestrian's map application. Based on the calculation from the MEMS sensors, the device 220 may receive the updated information through the pedestrian's map application. When all data calculated based on the user heading estimation block 605, the step may move to block 695 and end. In some embodiments, if the GPS/GNSS signals are received again with a signal strength greater than the threshold for GPS detection, the user heading estimation block 690 module of the processor may signal the device to end the calculation.

In one or more embodiments, the step/motion detect block 610, the roll and pitch estimation block 620, the sensor fusion block 630, the horizontal and vertical data accumulation block 640, the orthogonal axis computation block 660, forward/backward detection block 670, the misalignment angle and confidence estimation block 680, and the user heading estimation block 690 may be implemented as modules or units for processing input data. These logic blocks may be implemented within the processor and may perform according to specific algorithms or command instructions. However, in other embodiments, these logic blocks may be implemented as separate circuitry or chips that communicated with main processor of the device 220.

Figure 7:
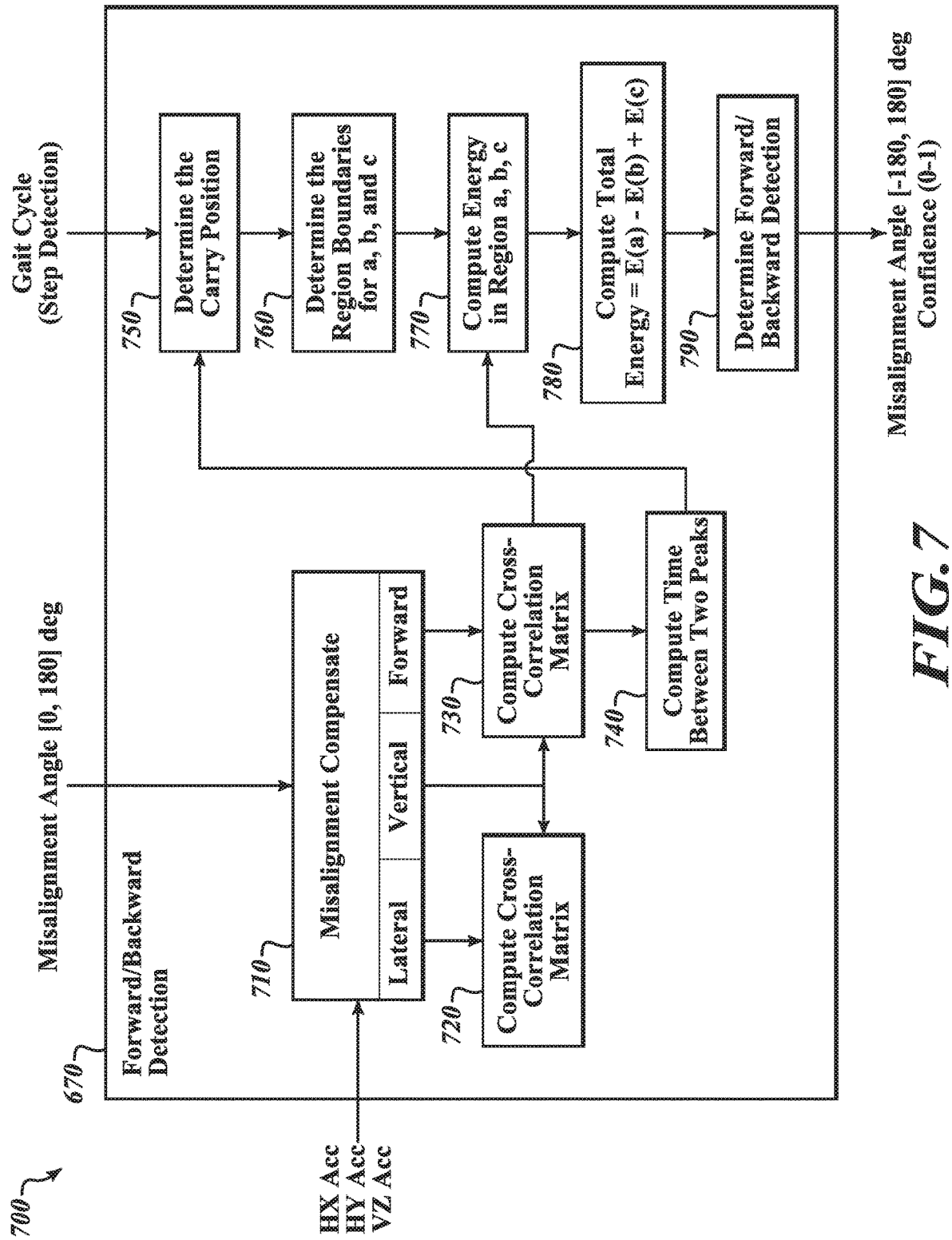
FIG. 7 is a detailed flow diagram showing forward/backward detection module according to an exemplary embodiment of the present disclosure.

FIG. 7 is a detailed flow diagram 700 of the forward/backward detection block 670 according to an exemplary embodiment of the present disclosure.

Figure 8B:
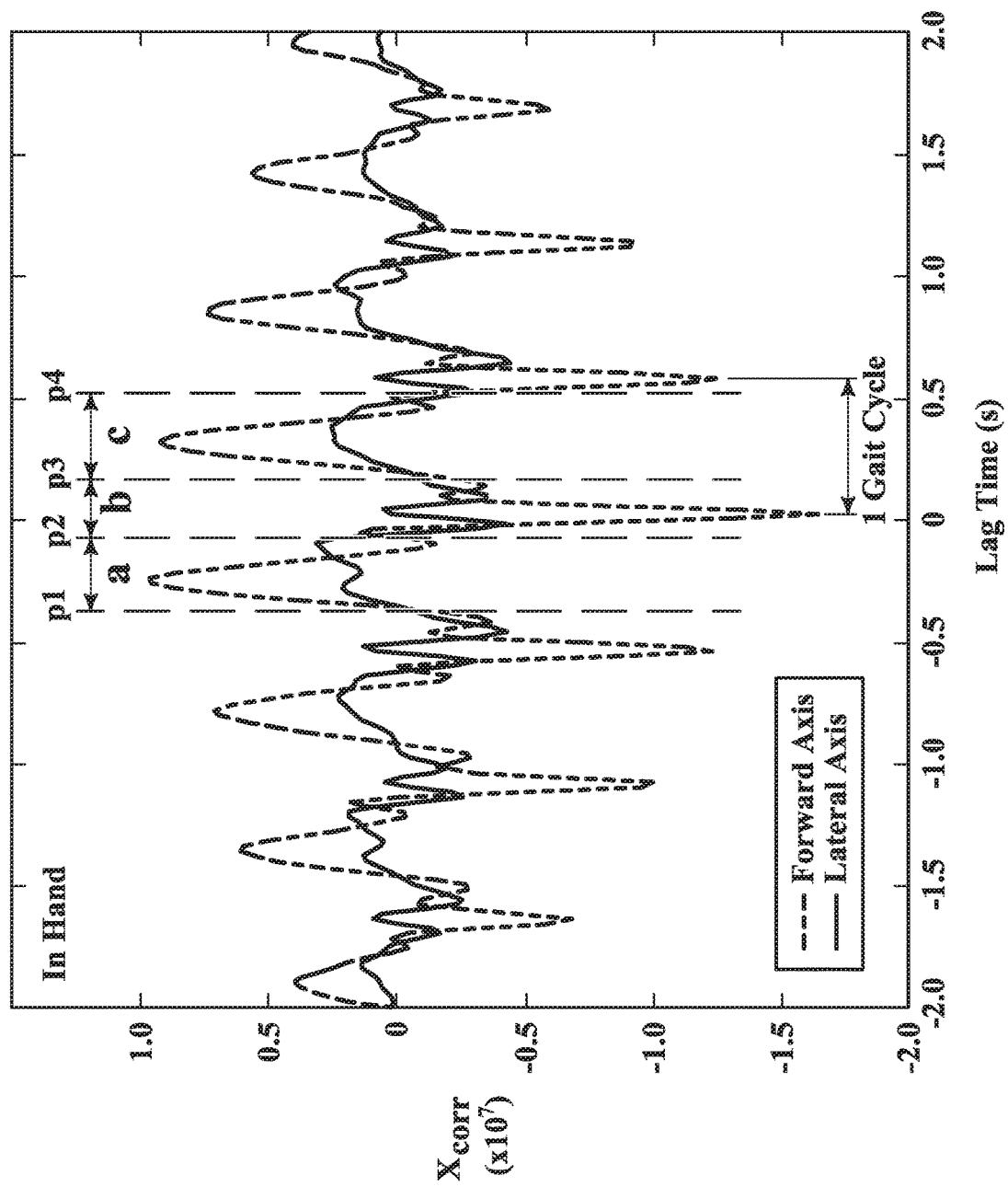
FIG. 8B shows a graph result of cross-correlation of the forward axis and lateral axis with the vertical axis while a pedestrian is having the device in hand.
Figure 8C:
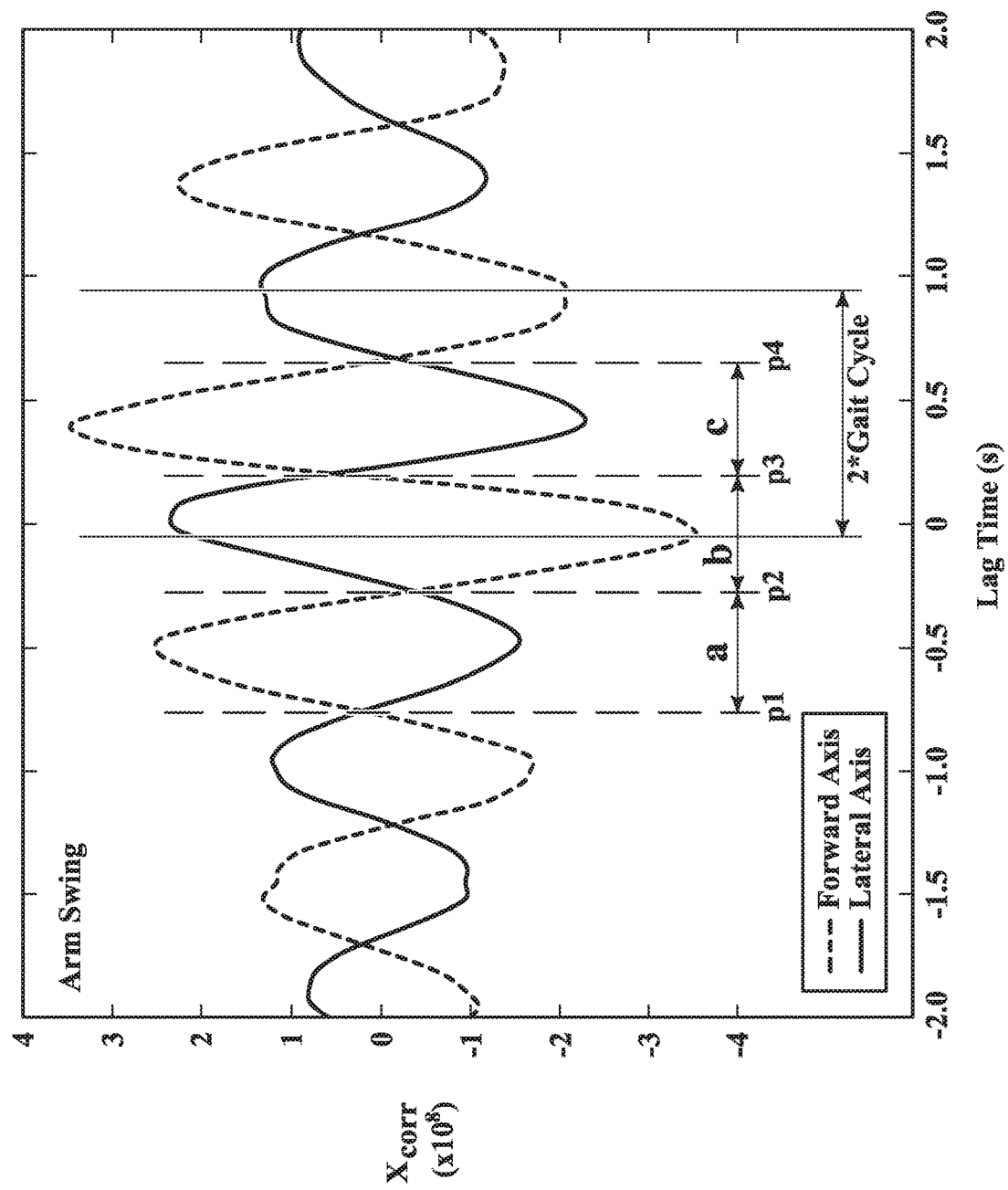
FIG. 8C shows a graph result of cross-correlation of the forward axis and lateral axis with the vertical axis during an arm swing of the pedestrian.

In one embodiment, the orthogonal axis computation block 660 provides a misalignment angle in the [0, 180] degree range. The forward/backward detection block 670 is responsible for determining the full range [−180,180] degree of the misalignment angle. The human 3D motion during a gait cycle goes though acceleration and deceleration during the swing and stance phase. While user is moving forward, there is a vertical movement also present due to heel strike and toe off. The acceleration pattern in forward acceleration and vertical acceleration has some phase angle with strong correlation as shown in FIGS. 8B and 8C. The unique feature in determining full range of user heading is utilizing cross correlation of forward and lateral axis with vertical acceleration axis.

In determining forward and backward direction, first at the misalignment compensate block 710, the misalignment angle and the horizontal and vertical components HX Acc, HY Acc, VZ Acc are received. In one embodiment, the cross correlation between the forward and vertical acceleration are computed at the cross-correlation matrix 730. In other embodiments, the cross correlation between the lateral and vertical acceleration are computed at the cross-correlation matrix 720. In another embodiment, the cross correlation between the forward, lateral and vertical acceleration are computed by using the cross-correlation matrix 720, 730.

FIG. 8B shows a graph result of the cross correlation of forward axis and lateral axis with the vertical axis while a pedestrian is having the device in hand. FIG. 8C shows a graph result of the cross correlation of forward axis and lateral axis with the vertical axis during an arm swing of the pedestrian.

By using the cross correlation of forward (X direction), lateral (Y direction), and vertical (Z direction) axis, the periodicity can be computed based on detecting two peaks in the cross correlation pattern. This computation is performed at block 740.

Referring to FIG. 8B, based on any two peaks of the forward axis or the lateral axis, a one gait cycle can be determined based on the periodic nature of the cross correlation pattern. In addition, referring to FIG. 8C, based on any two peaks of the forward axis or the lateral axis, a two gait cycle can be determined based on the periodic nature of the cross correlation pattern. In FIG. 8C, considering the arm swing, period between two adjacent peaks will indicate a two gait cycle. For example, if the pedestrian is carrying the device 220 in arm swing motion, the periodicity computed in the previous method will be double the step frequency computed by the step/motion detection block 610. This phenomenon is obvious due to the fact that human takes two steps for one full arm swing motion during the walk. In FIG. 8B, the normal in hand case, where the device is fixed to the body of the pedestrian, the period is the same as the step frequency. The processor at block 750 can determine the carry position based on the above assumptions.

After the carry position of the pedestrian is determined from block 750, the region boundaries are determined at block 760. The region boundaries are denoted as a, b, c as shown in FIGS. 8B and 8C. In addition, the dotted lines p1, p2, p3, p4 show the boundaries between regions a, b, and c. For example, region 'a' indicates the region between p1 and p2, and region b indicates the region between p2 and p3, and region c indicates the region between p3 and p4. In one embodiment, the region boundary may be denoted as [p1, p2, p3, p4]. For example, if the detected carry position is an arm swing, the region boundary may be represented as [−1.5, −0.5, 0.5, 1.5]. On the other hand, if the detected carry position is in hand and fixed to the pedestrian, the region boundary may be represented as [−0.75, −0.25, 0.25, 0.75]. As explained, an arm swing has one full swing once a pedestrian has taken two steps and this is the reason for factor 2 in the region boundary. The arm swing mode and the in hand mode are just examples to provide a better understanding, and the boundary determination and the calculation may differ based on the carry position. That is, the region/boundary represents the different phase of gait cycle and will be different for different carry positions.

At block 760, for an arm swing carry position, [−1.5, −0.5, 0.5, 1.5]*Gait Cycle will be outputted to block 770 for energy computation in regions a, b and c; and for an in hand swing carry position, [−1.5, −0.5, 0.5, 1.5]*Gait Cycle will be outputted to block 770 for energy computation in regions a, b and c.

Once the region boundaries of a, b, and c are determined based on the computation of the cross-correlations of the forward, lateral and vertical components, the energy of regions a, b, and c are computed at block 770. At block 770, the energy between point p1 and p2 is referred to as E(a), the energy between point p2 and p3 is referred to as E(b), and the energy between point p3 and p4 is referred to as E(c).

At block 780, the total energy E is computed by E=E(a)−E(b)+E(c). Based on the total energy E, block 790 can determine whether the pedestrian is moving forward or backward. For example, if the user is moving forward, the energy in region a and region c is positive and the energy in region b is negative. Accordingly, the total energy E value will be indicative of the forward or backward direction. In addition, if the pedestrian's motion is detected as being backward, the misalignment angle is corrected by subtracting with 180 degrees. Otherwise, no corrections are processed for a forward direction. In other embodiments, block 790 module may compute confidence in the misalignment angle output by checking the ratio of energy in the positive region (E(a), E(c)) and the negative region (E(b)).

Referring to FIG. 6, after the misalignment angle is output from the forward/backward detection block 670, the algorithm keeps monitoring the confidence to accept or reject the new misalignment angle output at the misalignment angle and confidence estimation block 680. Since misalignment angle remains constant for a short duration (>10 secs), the processor may reject any poor misalignment angle estimated in the previous steps of the algorithm. In some embodiments, the processor may refine the current estimation of misalignment angle by taking a weighted average with past measurement using confidence.

At user heading estimation block 690, after estimating misalignment angle, the processor will correct the device heading by subtracting misalignment angle to get the user heading.

In some embodiments, the algorithm produces an improved accuracy level for pedestrian mode cases. For example, the misalignment angle produced under the user heading estimation module will have less than 2 degrees deviation from the actual route.

In one or more embodiments, a data validity check is performed to ensure the quality and accuracy of the data. For example, a validity check may be performed based on straight line detection 420 and significant motion detection 430. This check is performed to ensure that the vehicle is moving in a straight line and the sensors are collecting some signature signal relevant for misalignment angle determination. These kinds of data validity check may be performed at any phase of the stage of the algorithm depending on the change of the motion status (e.g., both the vehicle and the pedestrian). That is, the data validity check process may be also used in the user heading estimation 605.

In some embodiments, once validity is confirmed, data components are stored in cumulative form to minimize the storage. For example, in the vehicle mode and the pedestrian mode misalignment angle calculation methods, both components of horizontal acceleration, e.g., X and Y component of the horizontal acceleration may be stored in cumulative form to minimize the storage. For example, the data may be stored in the form of a mean, variance, cross-correlation, or the like. By using the algorithms or methods according to the present disclosure as described herein, there is no dependency on GPS signals. According to the present disclosure, computing misalignment angle without GPS signal is possible. Therefore, a user of a vehicle or a pedestrian will not to worry about the quality of the GPS signal or latency in the place they are visiting and allow less dependency on sensor errors (e.g. bias, scale factor). According to the present disclosure, it is useful to start using sensor measurements immediately once GPS is available rather than wait until filter converge to correct misalignment error in good GPS coverage.

The algorithms and methods according to the present disclosure are not limited to the filters or designs as described. In other embodiments, to provide a reliable initial estimate to tune angle, a Kalman Filter (KF) may be used.

While various applications can be made based on the present disclosure, one exemplary application of the present disclosure according to one or more embodiments is the device 120, 220 communicating the results of the dead reckoning to another electronic device. The device 120, 220 may include modem chips, network and communication chips, or any suitable semiconductor chips capable of transmitting and receiving data. The device 120, 220 may also communicate based on various communication protocols, including Wi-Fi, Bluetooth, Zigbee, NFC (Near-field communication), cellular (e.g., 4G, 5G, LTE) etc. In one application, the device 120, 220 may relay the path information of the vehicle 110 or the pedestrian 210 calculated based on the misalignment angle to a device of another user. By relaying the updated path information to another user of the device, that user will be able to locate the vehicle 110 or the pedestrian 210.

The vehicle mode application of the present disclosure may be beneficial for ride hailing services. Ride hailing services are services that use online-enabled platforms to connect between passengers and local drivers using their personal vehicles. Examples of ride hailing services include Uber and Lyft. However, when GPS/GNSS signals are degraded or lost, customers trying to use these ride hailing services lose the location of the driver's vehicle. By utilizing the device 120, even in environments where GPS/GNSS signals are lost or weak, the driver of the vehicle 110 may be able to effectively communicate his/her location of the vehicle.

In other applications, after calculating the path information based on the misalignment angle, the device 120 may update the map application that the user in the vehicle 110 or the pedestrian 210 is using. The map application can be updated with the information calculated using the IMU even without the presence of GPS/GNSS signals. Once the map is correctly updated, the user of the vehicle or the pedestrian may be able to use map navigations without losing its current location.

In further applications, the device 120 for calculating the misalignment angle may be a standalone device that incorporates a chipset module, a receiver module, various sensors, any other suitable components for calculating and performing the aforementioned functions of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   detecting, by a gyroscope included in a device positioned on a vehicle, first data on an environment of the device;
   detecting, by an accelerometer included in the device positioned on a vehicle, second data on the environment of the device;
   receiving a plurality of sensor data including the first data and the second data;
   analyzing the plurality of sensor data to determine a first axis of the vehicle, the first axis of the vehicle indicative of a movement direction of the vehicle;
   analyzing the plurality of sensor data to determine a second axis of the device, the second axis indicative of a heading of the device; and
   calculating an angle between the first axis of the vehicle and the second axis of the device,
   wherein the determining the first axis of the vehicle includes:
      analyzing the second data to determine an acceleration of the vehicle;
      determining a movement direction of the vehicle based on the acceleration of the vehicle; and
      determining the movement direction of the vehicle as the first axis of the vehicle.

2. The method of claim 1, wherein the plurality of sensor data further includes a third data from a global positioning system (GPS) sensor.

3. The method of claim 2, wherein the plurality of sensor data is indicative of motion data of the device and motion data of the vehicle.

4. The method of claim 2, wherein the device is in close proximity to the vehicle.

5. The method of claim 1, wherein the analyzing the plurality of sensor data to determine a second axis of the device includes:
   analyzing the first data to determine a tilt direction of the device;
   determining the heading of the device based on the tilt direction; and
   determining the heading direction of the device as the second axis of the vehicle.

6. The method of claim 1, wherein a tilt direction of the device includes a pitch, yaw, and roll angle of the device calculated based on the first data from the gyroscope.

7. The method of claim 5, wherein the calculating an angle between the first axis of the vehicle and the second axis of the device includes:
   analyzing the first and second data, and the heading direction of the device to determine horizontal components of the device;
   applying a rotation matrix between the horizontal components of the device and the movement direction of the device; and
   determining the angle between the first and second axes based on the rotation matrix.

8. The method of claim 7, wherein the rotation matrix is an orthogonal rotation matrix.

9. The method of claim 7, wherein the analyzing the first and second data, and the heading direction of the device to determine horizontal components of the device includes:
   applying a singular value decomposition to reduce correlation between the horizontal components of the device.

10. A method, comprising:
    detecting, by an accelerometer included in a device, acceleration data about the device;
    determining a first mode and a second mode based on the acceleration data from the accelerometer of the device, the first mode indicating the device is within a vehicle and the second mode indicating the device is with a pedestrian user not inside a vehicle;
    selecting one of the first mode and the second mode based on the acceleration data from the accelerometer of the device;
    in response to selecting the first mode, receiving data from the accelerometer and a gyroscope of the device:
       determining a first misalignment angle based on the data from the accelerometer and the gyroscope; and
       outputting the first misalignment angle; and
    in response to selecting the second mode, receiving data from the accelerometer and the gyroscope:
       determining a second misalignment angle based on data from the accelerometer and the gyroscope; and
       outputting the second misalignment angle.

11. The method of claim 10, wherein the determining a first mode and a second mode is further based on GPS data.

12. The method of claim 10, wherein the selecting one of the first mode and the second mode is further based on a pre-stored library in a memory of the device, the pre-stored library including accelerometer data and gyroscope data associated with motions of vehicles and pedestrians.

13. A method, comprising:
    detecting first data using a gyroscope included in a device and second data using an accelerometer included in the device, the device having a first axis and a second axis perpendicular to the first axis, the first axis indicative of a forward direction of the accelerometer of the device;
    determining a motion status of a user associated with the device;

determining horizontal and vertical acceleration components of the device based on the first and second data; and calculating a misalignment angle based on the horizontal and vertical acceleration components of the device and the motion status of the user.

14. The method of claim 13, wherein the calculating a misalignment angle based on the horizontal and vertical acceleration components of the device and the motion status of the user includes:

reducing correlation between the horizontal acceleration components in a first direction and a second direction perpendicular to the first direction using a singular value decomposition operation; and applying orthogonal axis computation between the horizontal acceleration components of the device and the motion status of the user, wherein the motion status of the user includes a direction of the movement of the user.

15. The method of claim 14, further comprising:

computing the horizontal and vertical acceleration components using a cross-correlation matrix;

analyzing a gait pattern of the user based on the cross-correlation matrix and the motion status of the user;

calculating a total energy associated with the gait pattern; and adjusting the calculated misalignment angle based on the total energy.

16. A method, comprising:

detecting gyroscope data by a gyroscope included in a device positioned on a vehicle;

analyzing the gyroscope data to determine a forward axis and a lateral axis of a sensor frame of the device, the forward axis and the lateral axis being perpendicular to each other, the forward axis indicative of a heading of the device;

detecting accelerometer data by an accelerometer included in the device;

analyzing the accelerometer data to determine a longitudinal direction of a vehicle frame of the vehicle, the longitudinal direction indicative of a heading of the vehicle, the accelerometer data including angular acceleration and linear acceleration of the vehicle;

calculating a horizontal component of the forward axis of the sensor frame and a horizontal component of longitudinal direction of the vehicle frame; and determining a misalignment angle using the horizontal components of the sensor frame and the vehicle frame.

17. The method of claim 16, wherein the analyzing accelerometer data includes:

utilizing non-holonomic constraints of the vehicle, the non-holonomic constraints of the vehicle indicating the vehicle moving forward and backward in an accelerating or a decelerating manner; and calculating the angular acceleration and the linear acceleration of the vehicle.

18. The method of claim 17, wherein the determining a misalignment angle includes:

applying orthogonal axis computation on the forward axis of the sensor frame and the longitudinal direction of the vehicle frame to identify axis orientation of the sensor frame and the vehicle frame; and reducing correlation between a vector of the forward axis of the sensor frame and a vector of the longitudinal direction of the vehicle frame.

19. The method of claim 18, wherein the applying orthogonal axis computation includes:

calculating using an autocorrelation transformation matrix;

using singular value decomposition to reduce correlation between the axis orientation of the sensor frame and the vehicle frame; and performing an error correction process to output the misalignment angle with reduced errors.

* * * * *